(12) United States Patent
Marmigere et al.

(10) Patent No.: US 8,198,982 B2
(45) Date of Patent: Jun. 12, 2012

(54) PROVIDING PARCEL PROCUREMENT WITH ACKNOWLEDGEMENT OF RECEIPT IN AN INTELLIGENT MAILBOX

(75) Inventors: Gerard Marmigere, Drap (FR); Eric Menguy, Roquefort les pins (FR); Joaquin Picon, St. Laurent du Var (FR); Carole Truntschka, St. Laurent du Var (FR)

(73) Assignee: International Business Machines Corporation, Armonk, NY (US)

( * ) Notice: Subject to any disclaimer, the term of this patent is extended or adjusted under 35 U.S.C. 154(b) by 854 days.

(21) Appl. No.: 12/269,359

(22) Filed: Nov. 12, 2008

(65) Prior Publication Data
US 2010/0097174 A1   Apr. 22, 2010

(30) Foreign Application Priority Data

Oct. 21, 2008  (EP) .................................... 08305709

(51) Int. Cl.
*G08B 29/00* (2006.01)
(52) U.S. Cl. ....................................................... 340/5.7
(58) Field of Classification Search .................. 340/5.7, 340/5.73, 5.8, 5.81, 5.82, 5.83, 5.85, 568.1, 340/569, 692, 5.2, 531, 5.9; 232/19, 18, 232/34, 35, 36, 37; 713/186, 202, 182, 185, 713/169
See application file for complete search history.

(56) References Cited

U.S. PATENT DOCUMENTS

| | | | |
|---|---|---|---|
| 6,957,767 B2 | 10/2005 | Aupperle et al. | |
| 6,967,575 B1 * | 11/2005 | Dohrmann et al. | ........ 340/568.1 |
| 7,183,919 B2 | 2/2007 | Wang | |
| 7,249,705 B2 | 7/2007 | Dudley | |
| 2001/0045449 A1 | 11/2001 | Shannon | |
| 2002/0014953 A1 | 2/2002 | Stephens et al. | |
| 2002/0111914 A1 * | 8/2002 | Terada et al. | ................... 705/60 |
| 2002/0113703 A1 * | 8/2002 | Moskowitz et al. | ........ 340/568.1 |
| 2002/0156645 A1 | 10/2002 | Hansen | |
| 2002/0169628 A1 | 11/2002 | Bauer | |
| 2003/0085215 A1 | 5/2003 | Rix | |
| 2003/0105729 A1 | 6/2003 | Waxler | |
| 2003/0121968 A1 | 7/2003 | Miller et al. | |
| 2003/0154891 A1 | 8/2003 | Fassbender et al. | |
| 2004/0122780 A1 | 6/2004 | Devar | |
| 2004/0149822 A1 | 8/2004 | Stevens et al. | |
| 2006/0122852 A1 | 6/2006 | Moudy | |
| 2007/0096870 A1 * | 5/2007 | Fisher | ......................... 340/5.53 |

* cited by examiner

*Primary Examiner* — Nabil Syed
(74) *Attorney, Agent, or Firm* — Cantor Colburn LLP; Jean Sullivan

(57) ABSTRACT

A method for providing a procuration to a user on behalf of a letter or parcel recipient for authorizing this user to retrieve this letter or parcel with acknowledgement of receipt in an intelligent mailbox. Exemplary embodiments include a method to forward delegation between the original recipient and the delegated user through an exchange supported by any electronic or physical protocol of a delegation information made of the recipient unique identifier, a validity period and a hashcode, signed with the recipient private key and the mailbox public key.

1 Claim, 7 Drawing Sheets

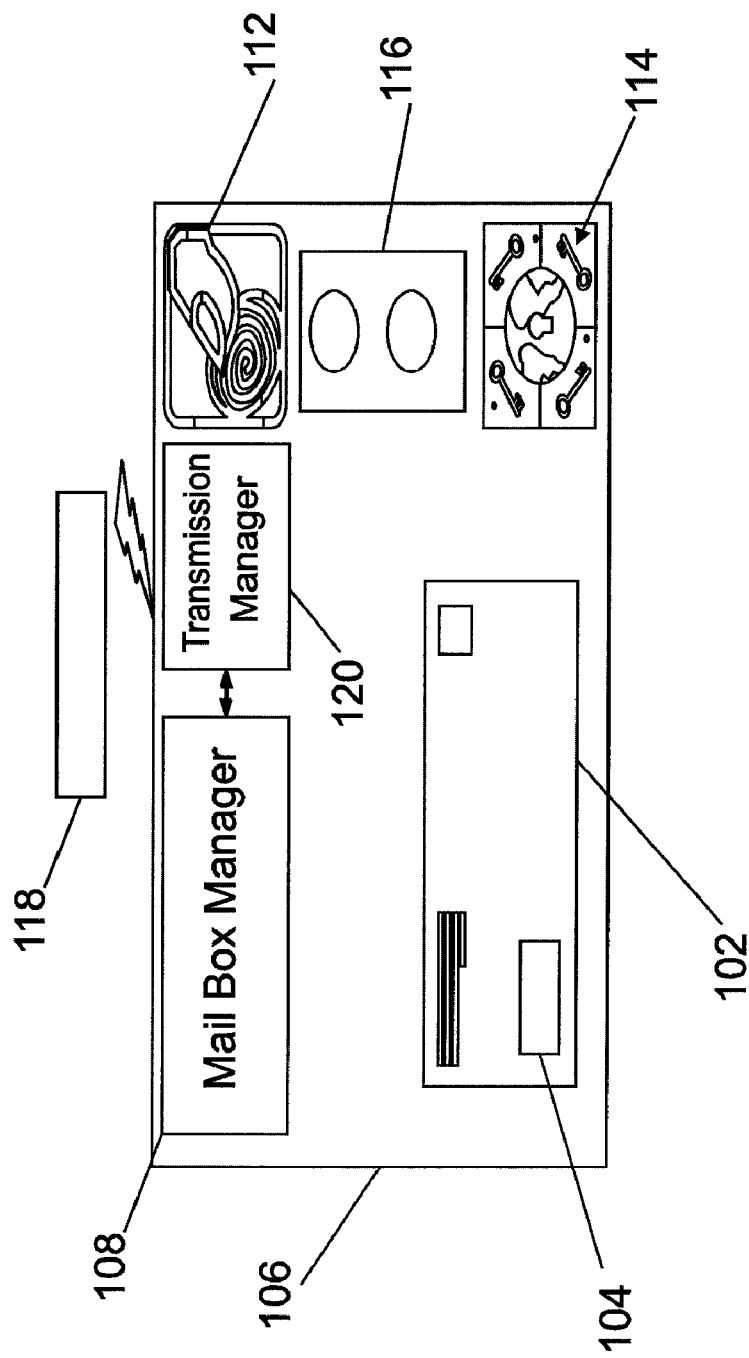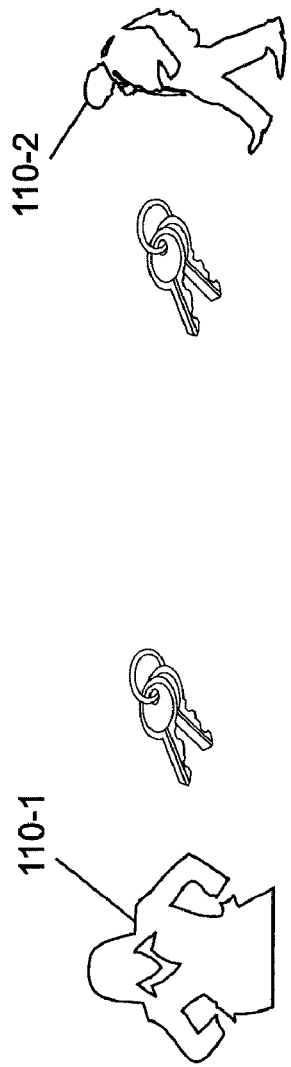
FIG. 1

FIG. 6

Authorized Key Table 600

| KUID | PublicKey | Bio1 | Bio2 | Bio3 |
|---|---|---|---|---|
| UserA | KPu_UserA | @6576 | @6576 | @6576 |
| UserB | KPu_UserB | @875 | @875 | @875 |
| UserC | KPu_UserC | | | |
| ... | ... | ... | ... | ... |
| Postman1 | KPu_Postman1 | | | |
| Postman2 | KPu_Postman2 | | | |
| Postman3 | KPu_Postman3 | | | |

Delegation Table 700

| Owner | Delegate | Start | Stop |
|---|---|---|---|
| UserA | UserB | 21/06/08 08H00 | 21/06/08 20H00 |
| UserA | UserC | 22/06/08 08H00 | 28/06/08 8H00 |
| UserB | UserC | 20/07/08 08H00 | 28/07/08 8H00 |
| UserC | UserA | 22/06/08 08H00 | 28/06/08 8H00 |
| ... | ... | ... | ... |
| 710 | 720 | 730 | 740 |

PROVIDING PARCEL PROCUREMENT WITH ACKNOWLEDGEMENT OF RECEIPT IN AN INTELLIGENT MAILBOX

This application claims priority to European Patent Application No. 08305709.1, filed 21 Oct. 2008, and all the benefits accruing therefrom under 35 U.S.C. §119, the contents of which in its entirety are herein incorporated by reference

CROSS REFERENCE TO RELATED APPLICATIONS

This application is related to U.S. patent application entitled "Insuring Personal Mail Delivery With Automatic Acknowledgement" having Ser. No. 12/269,353 and being filed concurrently.

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND

1. Field

This invention relates to intelligent physical mailbox, and particularly to the use of RFID tags to indicate a parcel in need of an acknowledgement of receipt.

2. Description of Background

Residential and commercial mailboxes can be individually located or grouped within a framework of collective buildings and an individual owner can open his own mailbox with one key. Alternatively, a mailman can globally open a collective of mailboxes with another key. Currently, the Post Office can track parcel delivery based on a system where the mailman can manually set the status of the parcel. Typically, the mailman can generate a paper for the addressee if the addressee is not available to receive the parcel. This paper can be valid for a period of time, such as fifteen days. With a system that automatically manages an addressee's electronic signature in a secure manner, it would be desirable for an addressee to delegate the opening of his mailbox, thereby allowing another person to retrieve a parcel that requires the addressees acknowledge of receipt.

SUMMARY

Exemplary embodiments include a method for authorizing a user to pickup a parcel with acknowledgement of receipt in a mailbox, the method including determining an insertion a key including a first biometric data into a biometric reader, determining a second biometric data as indicated by an RFID tag enclosed in a parcel having been previously introduced in the mailbox and requiring an acknowledgement of receipt from a predetermined user, the RFID tag having been read by an RFID reader of the mailbox, comparing the first and second biometric data and if the first and second biometric data do not match, closing a biometric lock and if the first and second biometric data do match, opening the biometric lock, opening a traditional lock on the mailbox if the biometric lock has been opened, displaying one of an indication to a user of a presence of the parcel needing acknowledgement of receipt from the addressee, and an indication to a postman that an acknowledgement of receipt can be picked up and recording a pickup of the parcel by a processor and a memory in the mailbox and information including user identity, date and time related to the pickup, which is retrievable by the postman either in person or remotely via a transmitter.

Further exemplary embodiments include a system for authorizing a user to pickup a parcel with acknowledgement of receipt in a mailbox, the system including an RFID reader operatively coupled to the mailbox, a biometric reader operatively coupled to the mailbox, a processor operatively coupled to the mailbox, a memory operatively coupled to the mailbox, a biometric lock operatively coupled to the mailbox and a traditional lock operatively coupled to the mailbox, wherein the processor is configured for determining an insertion a key including a first biometric data into a biometric reader, determining a second biometric data as indicated by an RFID tag enclosed in a parcel having been previously introduced in the mailbox and requiring an acknowledgement of receipt from a predetermined user, the RFID tag having been read by an RFID reader of the mailbox, comparing the first and second biometric data and if the first and second biometric data do not match, closing a biometric lock and if the first and second biometric data do match, opening the biometric lock, opening a traditional lock on the mailbox if the biometric lock has been opened, displaying one of an indication to a user of a presence of the parcel needing acknowledgement of receipt from the addressee, and an indication to a postman that an acknowledgement of receipt can be picked up and recording a pickup of the parcel by a processor and a memory in the mailbox and information including user identity, date and time related to the pickup, which is retrievable by the postman either in person or remotely via a transmitter.

Additional exemplary embodiments include a method for providing a procuration to a user on behalf of a parcel recipient for authorizing this user to retrieve this letter or parcel with acknowledgement of receipt in an intelligent mailbox, the method including extracting a list of delegation rights contained in an inserted key when the key is inserted in the intelligent mailbox waiting for a letter or parcel retrieval, unsigning the delegation with a private key, unsigning the delegation right with a recipient public key, determining delegation information made from a recipient unique identifier, a start time of the delegation, an end time of the delegation and a hashcode of the delegation information to prevent forged delegation information, comparing a hashcode of the recipient unique identifier, the start time of the delegation and the end time of the delegation with the determined hashcode, and if the hashcode of the delegation information and the hashcode of the recipient unique identifier do not match, disabling the parcel retrieval for the inserted key, comparing the delegation recipient unique identifier with the parcel recipient and if the recipients do not match, disabling the parcel retrieval for the inserted key, checking if a current time fits in between the start time of the delegation and the end time of the delegation and if the current time is not between the start time of the delegation and the end time of the delegation, disabling the letter parcel retrieval for the inserted key, opening a traditional lock on the mailbox if the delegation is confirmed and recording a pickup of the parcel by a processor and a memory in the intelligent mailbox, wherein pickup information includes a delegator identity, a date and a time related to the pickup of the parcel, the pick up information being retrievable by a postman either in person or remotely via a transmitter coupled to the processor.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution that insures personal mail delivery through the use of biometric keys and intelligent mailboxes. The summarized invention reduces the need for trips by an end user to travel to an office to pick up an unacknowledged parcel.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 1 illustrates an exemplary embodiment of a system for an intelligent mailbox.

FIG. 6 illustrates a table for identifying authorized keys mapped to biometric features.

FIG. 7 illustrates a table for identifying delegated users in accordance with exemplary embodiments.

Figure 2:
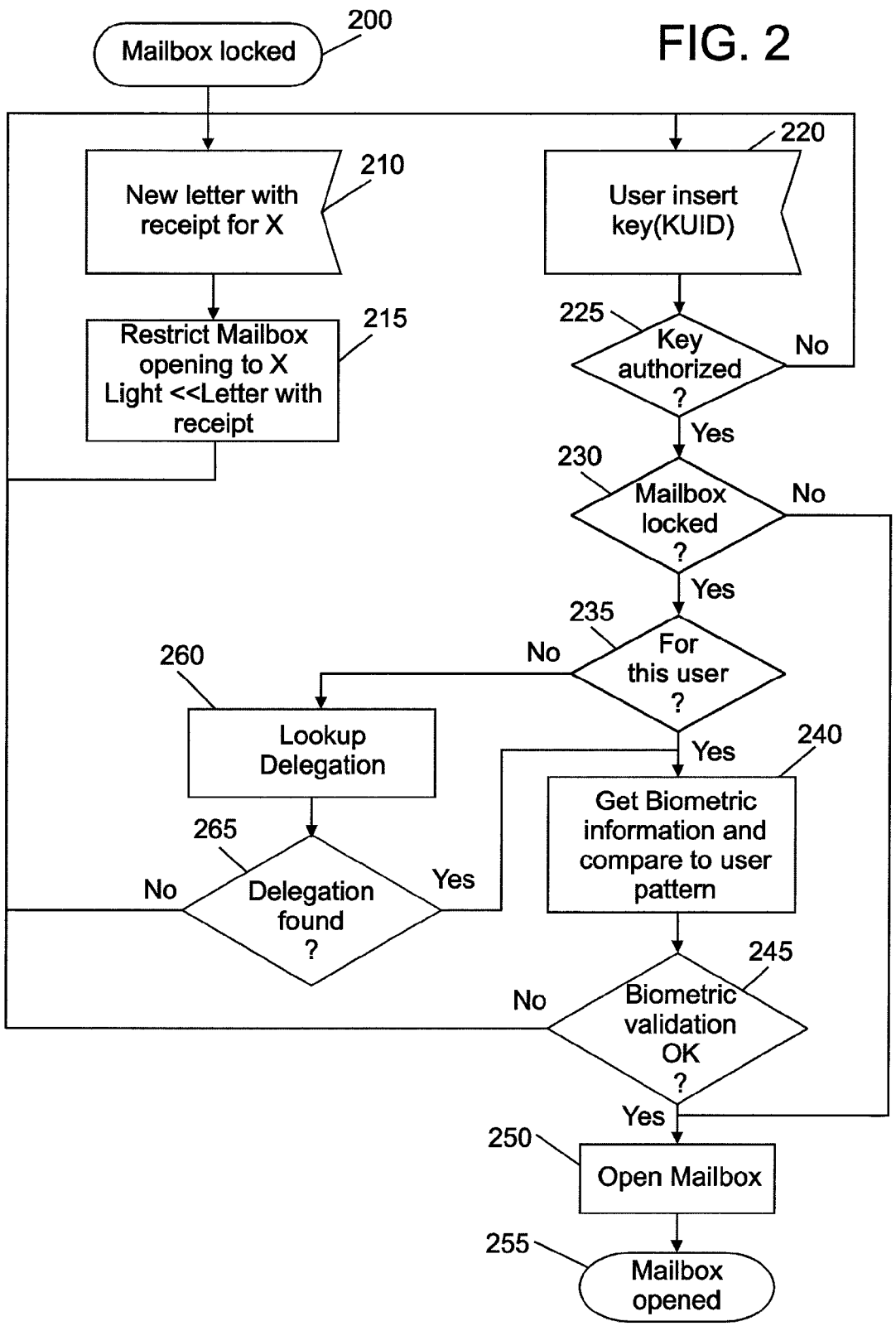
FIG. 2 illustrates a flow chart of a method for providing parcel procurement with acknowledgement of receipt in an intelligent mailbox.

The detailed description explains the preferred embodiments of the invention, together with advantages and features, by way of example with reference to the drawings.

DETAILED DESCRIPTION

Exemplary embodiments include methods, systems and computer program products for providing parcel procurement with acknowledgement of receipt in an intelligent mailbox. It is appreciated that as described herein, "parcel" refers to any letter, package or envelope currently used by carriers such as the post office. In addition, "mailbox" refers to any type of drop box for parcels. The methods, systems and computer program products described herein provide parcels having an automatic identification device such as a radio frequency identification (RFID) device. In exemplary embodiments, the mailbox. Includes an RFID reader, a biometric reader, a processor unit with a memory, a display to indicate the presence of the parcel that requires receipt from the addressee. In exemplary embodiments, the mailbox keys include a unique identifier (KUID) related to the key owner, a private key for the owner (e.g., RSA which is an algorithm for public key cryptography), a public key for the mailbox, a list of other KUIDs, and an apparatus to provide RSA encryption (e.g., message-digest algorithm 5 (MD5) as a partially secure cryptographic hash function, or secure hash algorithm (SHA)).

FIG. 1 illustrates an exemplary embodiment of a system 106 for an intelligent mailbox. An object 102, which can be a parcel, containing an RFID tag 104 is introduced into the intelligent mailbox 106. In exemplary embodiments, the RFID 104 can indicate to the mailbox manager 108 that an acknowledgement signature from a user 110-1 is required. The biometric lock 112 is activated in response to this indication, which prohibits another user 110-2 from accessing the mailbox via the traditional lock 114. The status of the mailbox is displayed through a graphical user interface 116. A mandate 118 is received by the mailbox manager 108 though the transmission manager 120.

FIG. 2 illustrates a flow chart of a method for providing parcel procurement with acknowledgement of receipt in an intelligent mailbox in accordance with exemplary embodiments. Initially, a mailbox is locked at block 200. A mail carrier or parcel delivery person inserts a parcel requiring an acknowledgement into the mailbox at block 210. The mailbox at block 200 reads a RFID tag on the parcel and restricts access to the parcel at block 215. Additionally, a light is triggered at block 215 indicating the presence of a parcel in need of acknowledgement. A user key (KUID) is inserted into the mailbox at block 220. The mailbox reads the key and determines if the user key is authorized at block 225 to access the mailbox. If the key is authorized, mailbox determines if it is locked at block 230. If the mailbox is unlocked, indicating no parcels requiring acknowledgement present, then the mailbox is opened at block 250. If the mailbox is locked, indicating the presence of a parcel needing acknowledgement, the mailbox checks to see if the KUID matches the parcel addressee at block 235. If the KUID matches the parcel, the mailbox further reads in the user's biometric information at block 240. If the biometric information is valid for this particular key at block 245, then the mailbox is opened at block 250. If the KUID does not match the parcel, the mailbox checks a delegation table at block 260 and looks to see if the KUID used is found at block 265. If so, the biometric information is compared at block 240 and validated at block 245. Once validated at block 245, the mailbox is unlocked at block 250.

Figure 3:
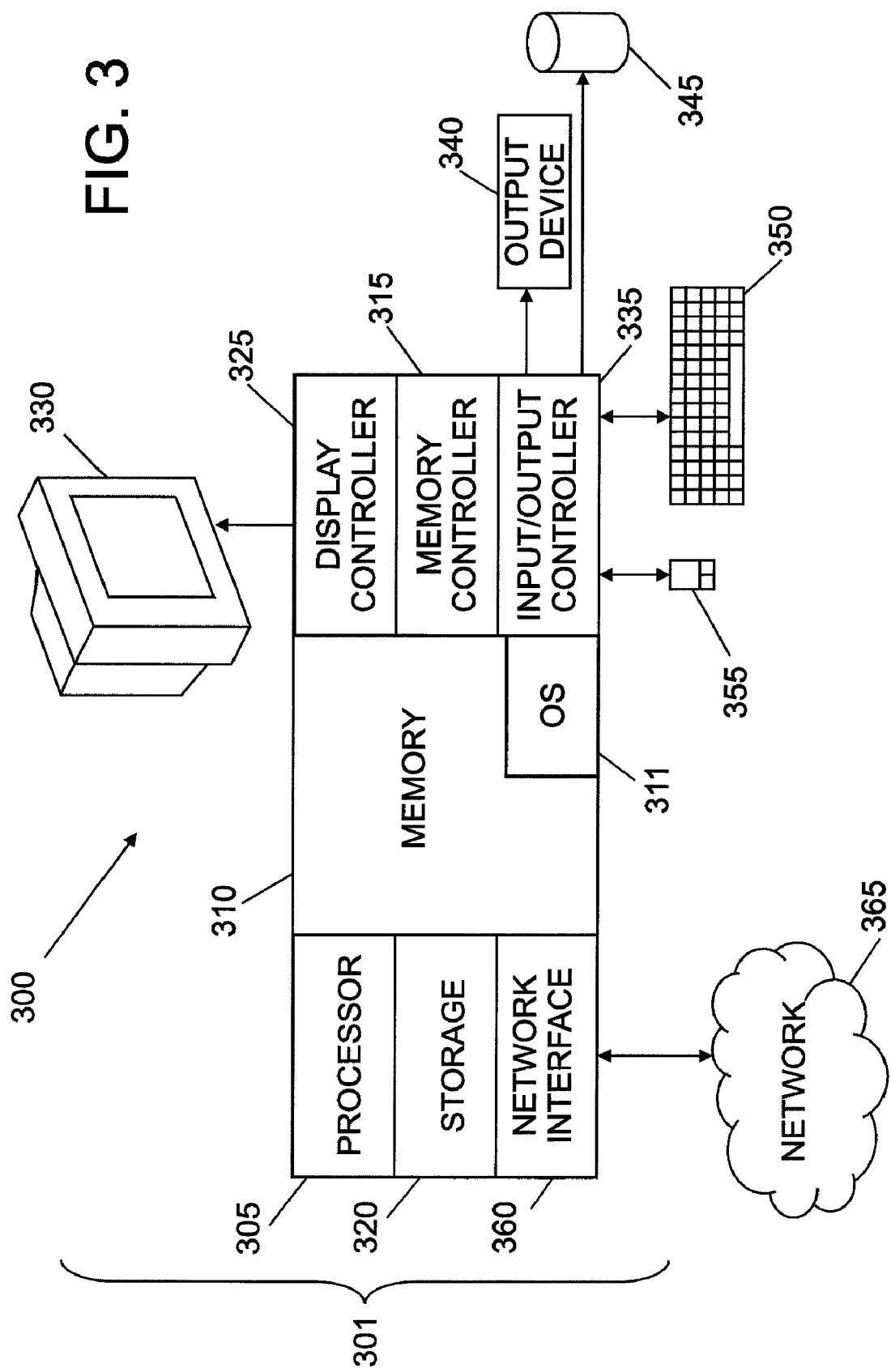
FIG. 3 illustrates an exemplary embodiment of a system for providing parcel procurement with acknowledgement of receipt in an intelligent mailbox in accordance with exemplary embodiments.

FIG. 3 illustrates an exemplary embodiment of a system 300 for providing parcel procurement with acknowledgement of receipt in an intelligent mailbox in accordance with exemplary embodiments. It is appreciated that the graphical user interface for displaying the presence of a parcel in need of acknowledgement can be found in the display controller 325. User manipulation can be performed using input/output controller. The methods described herein can be implemented in software (e.g., firmware), hardware, or a combination thereof In exemplary embodiments, the methods described herein are implemented in software, as an executable program, and is executed by a special or general-purpose digital computer, such as a personal computer, workstation, minicomputer, or mainframe computer. The system 300 therefore includes general-purpose computer 301.

In exemplary embodiments, in terms of hardware architecture, as shown in FIG. 3, the computer 301 includes a processor 305, memory 310 coupled to a memory controller 315, and one or more input and/or output (I/O) devices 340, 345 (or peripherals) that are communicatively coupled via a local input/output controller 335. The input/output controller 335 can be, for example but not limited to, one or more buses or other wired or wireless connections, as is known in the art.

The input/output controller 335 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 305 is a hardware device for executing software, particularly that stored in memory 310. The processor 305 can be any custom made or commercially available processor, a central processing unit (CPU), an auxiliary processor among several processors associated with the computer 301, a semiconductor based microprocessor (in the form of a microchip or chip set), a macroprocessor, or generally any device for executing software instructions.

The memory 310 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 310 may incorporate electronic, magnetic, optical, and/or other types of storage media. Note that the memory 310 can have a distributed architecture, where various components are situated remote from one another, but can be accessed by the processor 305.

The software in memory 310 may include one or more separate programs, each of which comprises an ordered listing of executable instructions for implementing logical functions. In the example of FIG. 3, the software in the memory 310 includes the RFID tag reading software, the transmission manager software, and the graphical user interface software described herein in accordance with exemplary embodiments and a suitable operating system (OS) 311. The operating system 311 essentially controls the execution of other computer programs, such as the lock activation and status indicator described herein, and provides scheduling, input-output control, file and data management, memory management, and communication control and related services.

The RFID tag reading software, the transmission manager software, and the graphical user interface software described herein may be in the form of a source program, executable program (object code), script, or any other entity comprising a set of instructions to be performed. When a source program, then the program needs to be translated via a compiler, assembler, interpreter, or the like, which may or may not be included within the memory 310, so as to operate properly in connection with the OS 311. Furthermore, the lock activation and status indicator methods can be written as an object oriented programming language, which has classes of data and methods, or a procedure programming language, which has routines, subroutines, and/or functions.

In exemplary embodiments, a conventional keyboard 350 and mouse 355 can be coupled to the input/output controller 335. Other output devices such as the I/O devices 340, 345 may include input devices, for example but not limited to a printer, a scanner, microphone, and the like. Finally, the I/O devices 340, 345 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 300 can further include a display controller 325 coupled to a display 330. In exemplary embodiments, the system 300 can further include a network interface 360 for coupling to a network 365. The network 365 can be an IP-based network for communication between the computer 301 and any external server, client and the like via a broadband connection. The network 365 transmits and receives data between the computer 301 and external systems. In exemplary embodiments, network 365 can be a managed IP network administered by a service provider. The network 365 may be implemented in a wireless fashion, e.g., using wireless protocols and technologies, such as WiFi, WiMax, etc. The network 365 can also be a packet-switched network such as a local area network, wide area network, metropolitan area network, Internet network, or other similar type of network environment. The network 365 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 301 is a PC, workstation, intelligent device or the like, the software in the memory 310 may further include a basic input output system (BIOS) (omitted for simplicity). The BIOS is a set of essential software routines that initialize and test hardware at startup, start the OS 311, and support the transfer of data among the hardware devices. The BIOS is stored in ROM so that the BIOS can be executed when the computer 301 is activated.

When the computer 301 is in operation, the processor 305 is configured to execute software stored within the memory 310, to communicate data to and from the memory 310, and to generally control operations of the computer 301 pursuant to the software. The RFID tag reading software, the transmission manager software, and the graphical user interface software described herein and the OS 311, in whole or in part, but typically the latter, are read by the processor 305, perhaps buffered within the processor 305, and then executed.

When the systems and methods described herein are implemented in software, as is shown in FIG. 3, it the methods can be stored on any computer readable medium, such as storage 320, for use by or in connection with any computer related system or method. In the context of this document, a computer readable medium is an electronic, magnetic, optical, or other physical device or means that can contain or store a computer program for use by or in connection with a computer related system or method. The assurance of personal mail delivery with automatic acknowledgement described herein can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In exemplary embodiments, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In exemplary embodiments, where the RFID tag reading software, the transmission manager software, and the graphical user interface software described herein can implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

As described herein, the mailbox keys include a unique identifier (KUID) related to the key owner, a private key for the owner (e.g., RSA which is an algorithm for public key cryptography), a public key for the mailbox, a list of other KUIDs, and an apparatus to provide RSA encryption (e.g., message-digest algorithm 5 (MD5) as a partially secure cryptographic hash function, or secure hash algorithm (SHA)).

In exemplary embodiments, a user A may give a delegation to user B by sending a delegation form by email or any other means. The delegation form can include at least the following delegation information: KUID Owner, KUID Delegate, Delegation period validity (Start and Stop date/time). In exemplary embodiments, the delegation form is built with delegation information and a signature which identifies the owner and can be calculated in the following format: RSAencrypt (RSAencrypt(Hash(Delagation_info), KprOwner), Kpu-Mailbox. In exemplary embodiments, each time a key is inserted in a Mailbox, KUID and all delegation forms are read by the mailbox. In addition, delegation is valid for only one level. For example, if A delegates to B and B delegates to C, C is not allowed to pickup a parcel for A.

Figure 4:
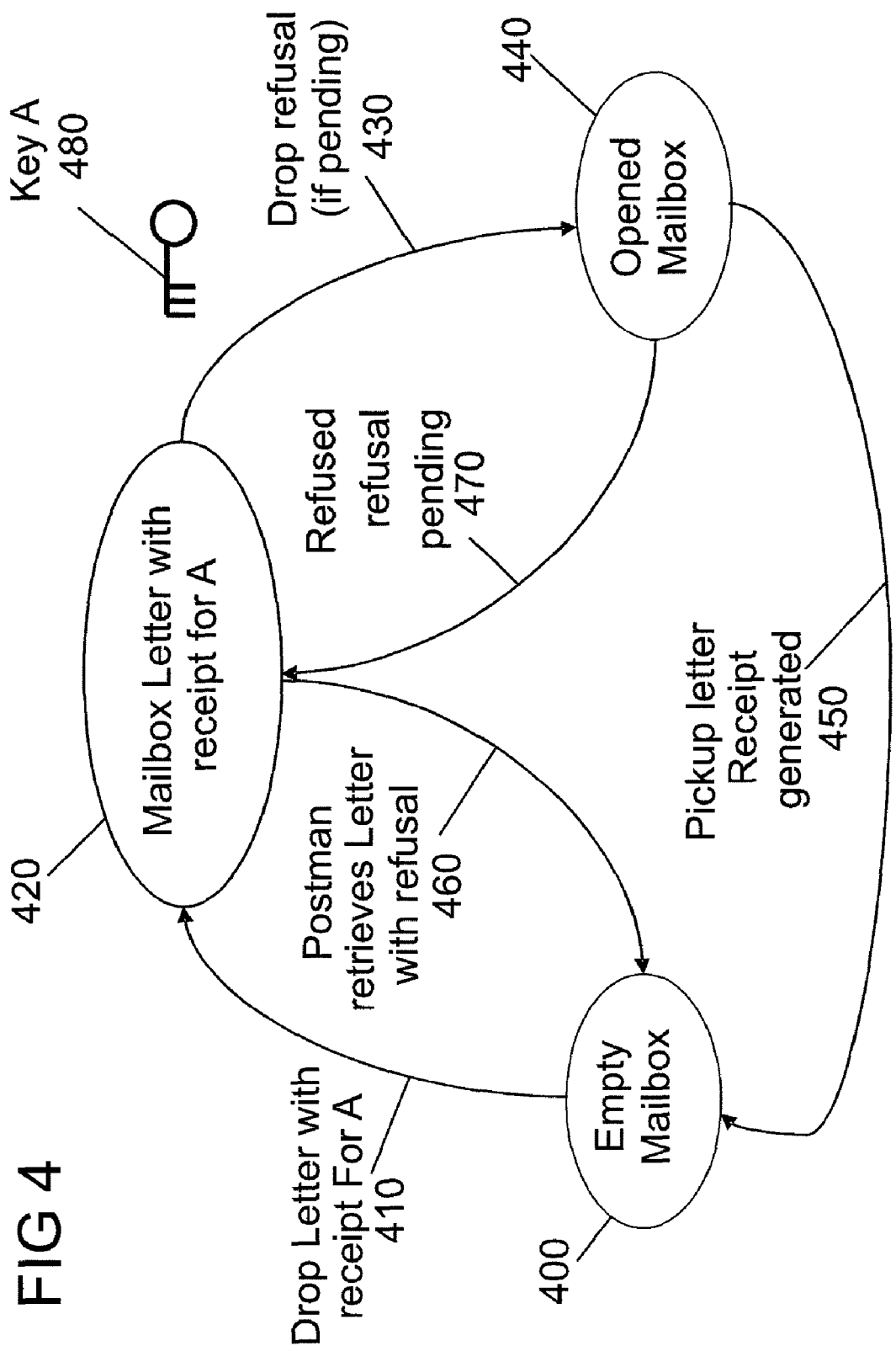
FIG. 4 illustrates a finite state machine of an example of providing parcel procurement with acknowledgement of receipt in accordance with exemplary embodiments.

FIG. 4 illustrates the finite state machine of an example of providing parcel procurement with acknowledgement of receipt in accordance with exemplary embodiments. Two cases are analyzed with FIG. 4.

Use Case 1: Receipt Delivered by Recipient

At block 410, a postman drops a parcel needing a receipt from user A in a mailbox belonging to user A, user B and user C at block 420. Users A, B and C have their own mailbox key KUID user at block 480. In exemplary embodiments, each of the users respectively has a key KUID A, KUID B and KUID C. In exemplary embodiments, user A (or user B/user C (if a owner of a delegation)) opens the mailbox at block 440 and obtains the parcel. A receipt is memorized in the mailbox with packetID, KUID_user,Date/time of removal. A indicator part (e.g., a light) of the mailbox indicates that a postman has to pick up a receipt at block 450. In exemplary embodiments, the receipt may be stored on the postman key, or directly sent after a predefined delay to the post office.

Use Case 2: Parcel Refused by Recipient

At block 410, a postman drops a parcel needing a receipt from user A in a mailbox belonging to user A, user B and user C at block 420. Users A, B and C have their own mailbox key KUID user at block 480. In exemplary embodiments, each of the users respectively has a key KUID A, KUID B and KUID C. In exemplary embodiments, user A (or user B/user C (if a owner of a delegation)) opens the mailbox at block 440 and does not obtain the parcel. In exemplary embodiments, a refusal is memorized in the mailbox with packetID, KUID_user,Date/time of mailbox open at block 470. An indicator part of the mailbox indicates that a postman has to pick up a refusal of the parcel at block 420. This refusal becomes definitive when the postman retrieves the parcel at block 460. However, the addressee may pick up the parcel and then refusal will be replaced by a receipt as described in Use Case 1 above.

Figure 5:
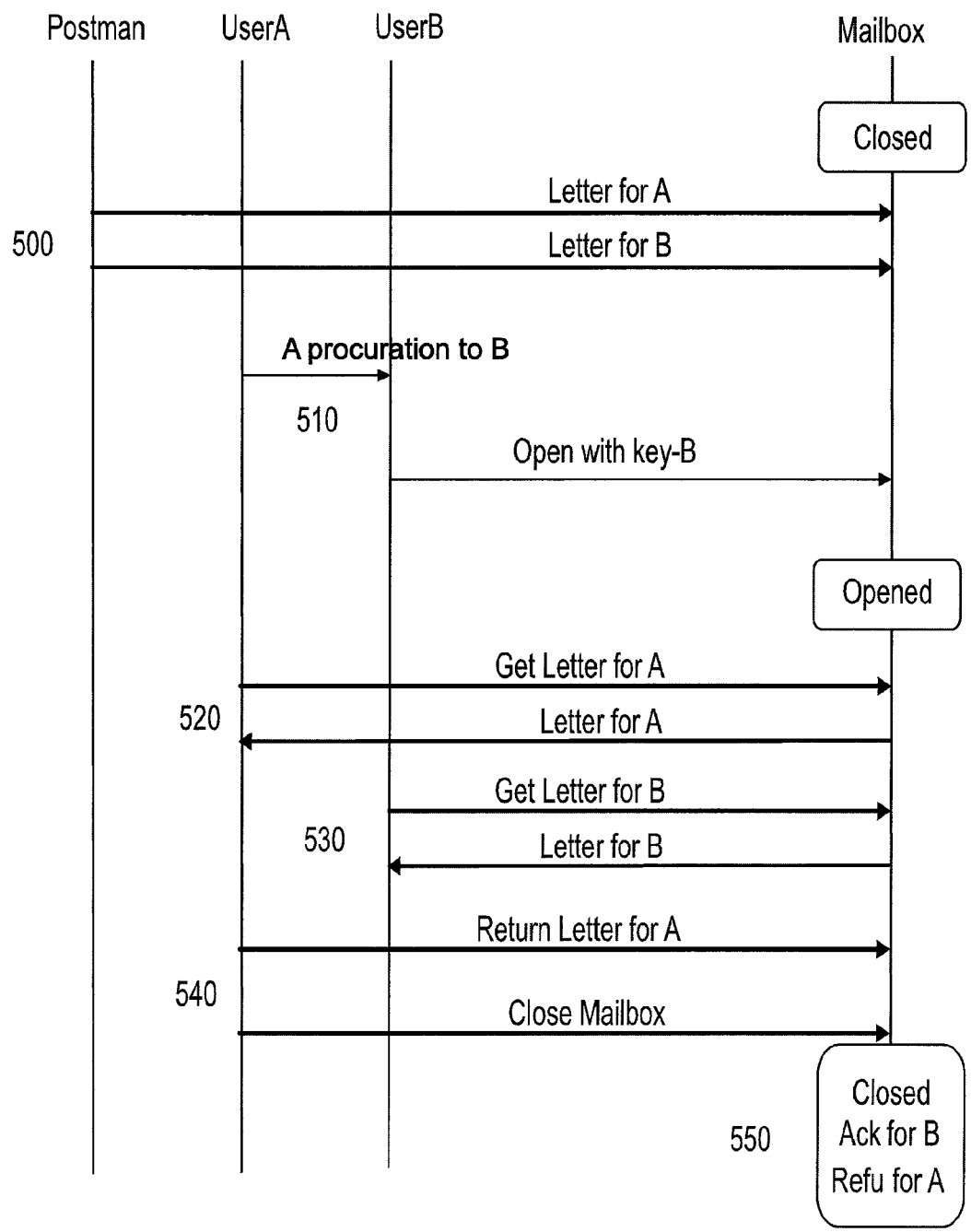
FIG. 5 illustrates a messages flow chart of an example of providing parcel procurement with acknowledgement of receipt in accordance with exemplary embodiments.

FIG. 5 illustrates a message flow of an example of providing parcel procurement with acknowledgement of receipt in accordance with exemplary embodiments.

Use Case 3: Parcels for Two Recipients

A postman drops a parcel needing receipts from user A and user B in a Mailbox belonging to user A, user B and user C at step 500. Users A, B and C have their own mailbox key KUID user. In exemplary embodiments, each of the users respectively has a key KUID A, KUID B and KUID C. In exemplary embodiments, the mailbox may be open only by using sequentially and in a defined time the keys of user A and user B or an other person having a delegation for A and/or B at step 510. If user A or user B has a delegation of the other, the mailbox may be used with only one key at step 510. If both parcels are picked up at step 520, receipts are generated as described previously at step 530. If one or more parcels are not picked up at step 540, refusal(s) is/are generated. The mailbox may be opened only by the addresse(s) or user with delegation at step 550.

FIG. 6 illustrates a table for identifying authorized keys mapped to biometric features in accordance with exemplary embodiments. An authorized Key table 600 records all keys allowed to open the mailbox. For each key or entry, the following information may be found: the Key Unique Identifier (KUID) 610, the owner RSA public key 620, and references for several live scans of owner Biometric characteristics (e.g., fingerprint, face, hand geometry, iris, . . . ) 630.

FIG. 7 illustrates a table for identifying delegated users in accordance with exemplary embodiments. A delegation table 700 can be a four column table where: the Owner is the KUID of the addressee 710, the Delegate is the KUID delegated 720, the Start is the date/time of beginning of delegation 730, and the Stop is the date/time of ending of delegation 740.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for providing a procuration to a user on behalf of a parcel recipient for authorizing this user, via a delegation, to retrieve this letter or parcel with acknowledgement of receipt in an intelligent mailbox, the method comprising:

extracting a list of delegation rights associated with the delegation, the list of delegation rights contained in an inserted key when the key is inserted in the intelligent mailbox waiting for a letter or parcel retrieval;

unsigning the delegation with a private key;

unsigning the delegation rights with a recipient public key;

determining delegation information associated with the delegation, and made from a recipient unique identifier, a start time of the delegation, an end time of the delegation and a hashcode of the delegation information to prevent forged delegation information;

comparing a hashcode of the recipient unique identifier, the start time of the delegation and the end time of the delegation with the determined hashcode, and if the hashcode of the delegation information and the hashcode of the recipient unique identifier do not match, disabling the parcel retrieval for the inserted key;

comparing the recipient unique identifier with the parcel recipient and if the recipients do not match, disabling the parcel retrieval for the inserted key;

checking if a current time fits in between the start time of the delegation and the end time of the delegation and if the current time is not between the start time of the delegation and the end time of the delegation, disabling the letter parcel retrieval for the inserted key;

confirming the delegation if hashcode of the delegation information and the hashcode of the recipient unique identifier match, and if the current time is between the start time of the delegation and the end time of the delegation;

opening a traditional lock on the mailbox if the delegation is confirmed; and recording a pickup of the parcel by a processor and a memory in the intelligent mailbox, wherein pickup information includes a delegator identity, a date and a time related to the pickup of the parcel, the pick up information being retrievable by a postman either in person or remotely via a transmitter coupled to the processor.

* * * * *